(12) United States Patent
Grisack

(10) Patent No.: US 10,775,839 B2
(45) Date of Patent: Sep. 15, 2020

(54) MONITOR STAND BASE WITH INTEGRATED OUTLETS

(71) Applicant: EXEMPLIS LLC, Cypress, CA (US)

(72) Inventor: Scott Grisack, Tampa, FL (US)

(73) Assignee: EXEMPLIS LLC, Cypress, CA (US)

(*) Notice: Subject to any disclaimer, the term of this patent is extended or adjusted under 35 U.S.C. 154(b) by 0 days.

(21) Appl. No.: 16/038,724

(22) Filed: Jul. 18, 2018

(65) Prior Publication Data

US 2019/0025877 A1    Jan. 24, 2019

Related U.S. Application Data

(60) Provisional application No. 62/534,386, filed on Jul. 19, 2017.

(51) Int. Cl.
| | | |
|---|---|---|
| *G06F 1/16* | (2006.01) | |
| *G06F 1/18* | (2006.01) | |
| *F16M 13/04* | (2006.01) | |

(52) U.S. Cl.
CPC ............ *G06F 1/1605* (2013.01); *F16M 13/04* (2013.01); *G06F 1/1607* (2013.01); *G06F 1/1632* (2013.01); *G06F 1/181* (2013.01); *F16M 2200/08* (2013.01)

(58) Field of Classification Search
CPC ................. G06F 1/1605; G06F 1/1632; G06F 2200/1631; G06F 1/1607
See application file for complete search history.

(56) References Cited

U.S. PATENT DOCUMENTS

| | | | | |
|---|---|---|---|---|
| 4,438,458 A | * | 3/1984 | Munscher | G06F 1/1601 248/184.1 |
| 4,729,533 A | * | 3/1988 | Hillary | B66F 7/0641 106/6 |
| 4,864,601 A | * | 9/1989 | Berry | H04M 11/066 379/93.07 |
| 5,107,402 A | * | 4/1992 | Malgouires | F16C 11/103 16/307 |
| 5,124,805 A | * | 6/1992 | Chung | F16M 11/125 348/825 |
| 5,278,779 A | * | 1/1994 | Conway | G06F 1/1616 341/20 |
| 5,321,579 A | * | 6/1994 | Brown | A47B 83/001 174/496 |
| 5,569,895 A | * | 10/1996 | Lynch | F16M 11/10 235/1 R |

(Continued)

FOREIGN PATENT DOCUMENTS

| | | |
|---|---|---|
| WO | 0071002 A1 | 11/2000 |
| WO | 2014054041 A2 | 4/2014 |

*Primary Examiner* — Adrian S Wilson
(74) *Attorney, Agent, or Firm* — Lerner, David, Littenberg, Krumholz & Mentlik, LLP

(57) ABSTRACT

Disclosed herein is a monitor stand base with integrated outlets. The monitor stand base may include a housing and an outlet array. The outlet array may be arranged within the housing and include at least one power outlet. The outlet array may include one or more ports. The monitor stand base may include an arm which may be detachably attached to the housing. The arm may include one or more links with telescopic elements to allow for length adjustments of each link. The one or more links may be rotatable with respect to each other.

13 Claims, 7 Drawing Sheets

(56) References Cited

U.S. PATENT DOCUMENTS

| | | | | |
|---|---|---|---|---|
| 5,632,463 | A * | 5/1997 | Sung | F16M 11/126 248/349.1 |
| 5,668,570 | A * | 9/1997 | Ditzik | G06F 1/16 248/923 |
| 5,978,211 | A * | 11/1999 | Hong | F16M 11/10 361/679.06 |
| 6,005,767 | A * | 12/1999 | Ku | G06F 1/162 345/169 |
| 6,081,420 | A * | 6/2000 | Kim | G06F 1/16 361/679.22 |
| 6,105,919 | A * | 8/2000 | Min | F16M 11/10 248/418 |
| 6,106,181 | A * | 8/2000 | Neuhof | F16C 11/10 16/330 |
| 6,108,195 | A * | 8/2000 | Behl | G06F 1/16 248/917 |
| 6,116,560 | A * | 9/2000 | Kim | F16M 11/10 248/371 |
| 6,134,103 | A * | 10/2000 | Ghanma | F16M 11/24 248/917 |
| 6,200,159 | B1 * | 3/2001 | Chou | H01R 13/6658 174/494 |
| 6,217,137 | B1 * | 4/2001 | Bitbaba | F16M 11/126 248/917 |
| 6,233,138 | B1 * | 5/2001 | Osgood | G06F 1/1616 248/920 |
| 6,268,998 | B1 * | 7/2001 | Cho | G06F 1/1601 248/917 |
| 6,275,375 | B1 * | 8/2001 | Nam | G06F 1/1601 248/346.06 |
| 6,418,010 | B1 * | 7/2002 | Sawyer | B60R 11/0235 248/918 |
| 6,484,994 | B2 * | 11/2002 | Hokugoh | F16M 11/10 248/371 |
| 6,510,049 | B2 * | 1/2003 | Rosen | F16M 11/105 248/919 |
| 6,552,888 | B2 | 4/2003 | Weinberger | |
| 6,585,203 | B1 * | 7/2003 | Euker | F16M 13/02 248/200.1 |
| 6,639,789 | B2 * | 10/2003 | Beger | A61B 90/50 248/276.1 |
| D494,971 | S * | 8/2004 | Jobs | D14/371 |
| 6,819,550 | B2 * | 11/2004 | Jobs | F16M 11/14 248/183.3 |
| 6,915,995 | B2 * | 7/2005 | Gillespie | F16M 11/08 248/278.1 |
| 7,038,906 | B2 * | 5/2006 | Hubbard | F16M 11/046 312/223.1 |
| 7,061,754 | B2 * | 6/2006 | Moscovitch | F16M 11/10 248/917 |
| 7,283,354 | B2 * | 10/2007 | Choi | F16M 11/105 361/679.27 |
| 7,500,870 | B2 * | 3/2009 | Picolli | H01R 27/02 307/140 |
| 7,578,490 | B2 * | 8/2009 | Kim | F16M 11/105 248/138 |
| 7,663,478 | B2 * | 2/2010 | Oh | F16M 11/08 340/384.1 |
| 7,773,371 | B2 * | 8/2010 | Hillman | F16M 11/08 248/917 |
| 8,794,579 | B2 * | 8/2014 | Sturman | F16M 11/105 248/284.1 |
| 8,922,457 | B2 * | 12/2014 | Moscovitch | G06F 1/1601 345/1.1 |
| 9,746,128 | B2 * | 8/2017 | Huang | F16M 11/2014 |
| 9,818,314 | B2 * | 11/2017 | Rodriguez | G02B 27/026 |
| 10,117,353 | B2 * | 10/2018 | Burns | G06F 1/1654 |
| 10,280,956 | B2 * | 5/2019 | Xiang | F16B 2/065 |
| 2001/0023914 | A1 * | 9/2001 | Oddsen, Jr. | F16M 11/10 248/274.1 |
| 2003/0075653 | A1 * | 4/2003 | Li | F16M 11/10 248/274.1 |
| 2003/0117700 | A1 * | 6/2003 | Vaccarelli | G02B 21/24 359/368 |
| 2003/0176100 | A1 * | 9/2003 | Yurek | H01R 27/00 439/535 |
| 2004/0011932 | A1 * | 1/2004 | Duff | F16M 11/10 248/157 |
| 2004/0031893 | A1 * | 2/2004 | Smed | F16M 11/10 248/278.1 |
| 2005/0006542 | A1 * | 1/2005 | Henning | F16C 11/10 248/274.1 |
| 2005/0036283 | A1 * | 2/2005 | Hillman | F16M 11/10 361/679.21 |
| 2006/0133016 | A1 * | 6/2006 | North | F16M 11/10 361/679.22 |
| 2006/0250767 | A1 * | 11/2006 | Brophy | G06F 1/1632 361/679.45 |
| 2010/0133208 | A1 | 6/2010 | Seo et al. | |
| 2012/0120581 | A1 * | 5/2012 | Haren | G06F 1/1607 361/679.21 |

* cited by examiner

MONITOR STAND BASE WITH INTEGRATED OUTLETS

CROSS-REFERENCE TO RELATED APPLICATION

The present application claims the benefit of the filing date of U.S. Provisional Patent Application No. 62/534,386, filed on Jul. 19, 2017, the disclosure of which is hereby incorporated by reference.

FIELD OF THE INVENTION

The present invention relates generally to power outlets, and in particular to power outlets integrated to a monitor support structure.

BACKGROUND OF THE INVENTION

Most modern office workstations include a variety of electrical equipment. For instance, a typical office workstation may include desktop computers, laptops, telephones, monitors, tablets, cell phones, projectors, printers, etc. Each of these pieces of electrical equipment relies on power sources to provide power to operate and/or charge a battery source integrated into the equipment.

Power sources within office workstations are usually limited to power outlets. These power outlets are often located on the workstation's walls, sometimes in remote and inaccessible locations. For instance, the power outlets may be positioned on a wall behind a desk. As such, connecting and disconnecting electrical equipment to the power outlets is inconvenient. In particular, users with portable equipment, such as cell phones and tablets, are inconvenienced by the need to repeatedly connect and disconnect the portable equipment to power outlets in difficult to access locations or in locations remote from the location of the user, such as on a distant wall. Moreover, the electrical equipment may have a power cord with a length that is insufficient to span the distance between the locations of electrical equipment and a power outlet.

Power outlets are not easily relocated once installed in a particular location. As such, relocation or rearrangement of the power outlets is generally not possible without the substantial labor of running additional power lines to locations within the office workstation. Extension cords may be used to connect power cords to distant power outlets, but the extension cords may create a workplace hazard such as a tripping hazard with extension and power cords running along the floor of the office workspace and circuits being overloaded with too many pieces of electrical equipment being connected to a single power outlet.

Accordingly, a need exists for a power source that is readily accessible to provide power to electrical equipment.

BRIEF SUMMARY OF THE INVENTION

Disclosed herein is a monitor stand base with integrated outlets.

In a first aspect of the present disclosure, a monitor stand base is provided. The monitor stand base according to this first aspect may include a housing and an outlet array. The outlet array may be arranged within the housing and may include at least one power outlet.

In accordance with this first aspect, the outlet array may further include one or more ports. The one or more ports may include a Universal Serial Bus (USB) socket. The one or more ports may include a firewire socket. The one or more ports may include a thunderbolt socket. The USB socket may be a USB slave device. The USB socket may be Micro USB socket.

In a second aspect of the present disclosure, a monitor stand base is provided. The monitor stand base according to this second aspect may include a housing, an arm, and an outlet array. The arm may be attached to the housing. The outlet array may be arranged within the housing and include at least one power outlet.

In accordance with this second aspect, the arm may include an adjustable element to detachably attach the arm to the housing. The adjustable element may be a rotatable knob.

Further in accordance with this second aspect, the monitor base may include one or more cable clips for cable management. The arm may include two or more links. At least one of the one or more links may include telescopic elements to increase the length of the link. The one or more links may be rotatable with respect to each other.

Still further in accordance with this second aspect, the outlet array may include one or more ports. The one or more ports may include a Universal Serial Bus (USB) socket. The one or more ports may include a firewire socket. The one or more ports may include a thunderbolt socket. The USB socket may be a USB slave device. The USB socket may be Micro USB socket.

BRIEF DESCRIPTION OF THE DRAWINGS

A more complete appreciation of the subject matter of the present invention and the various advantages thereof may be realized by reference to the following detailed description, in which reference is made to the following accompanying drawings.

DETAILED DESCRIPTION

Figure 1:
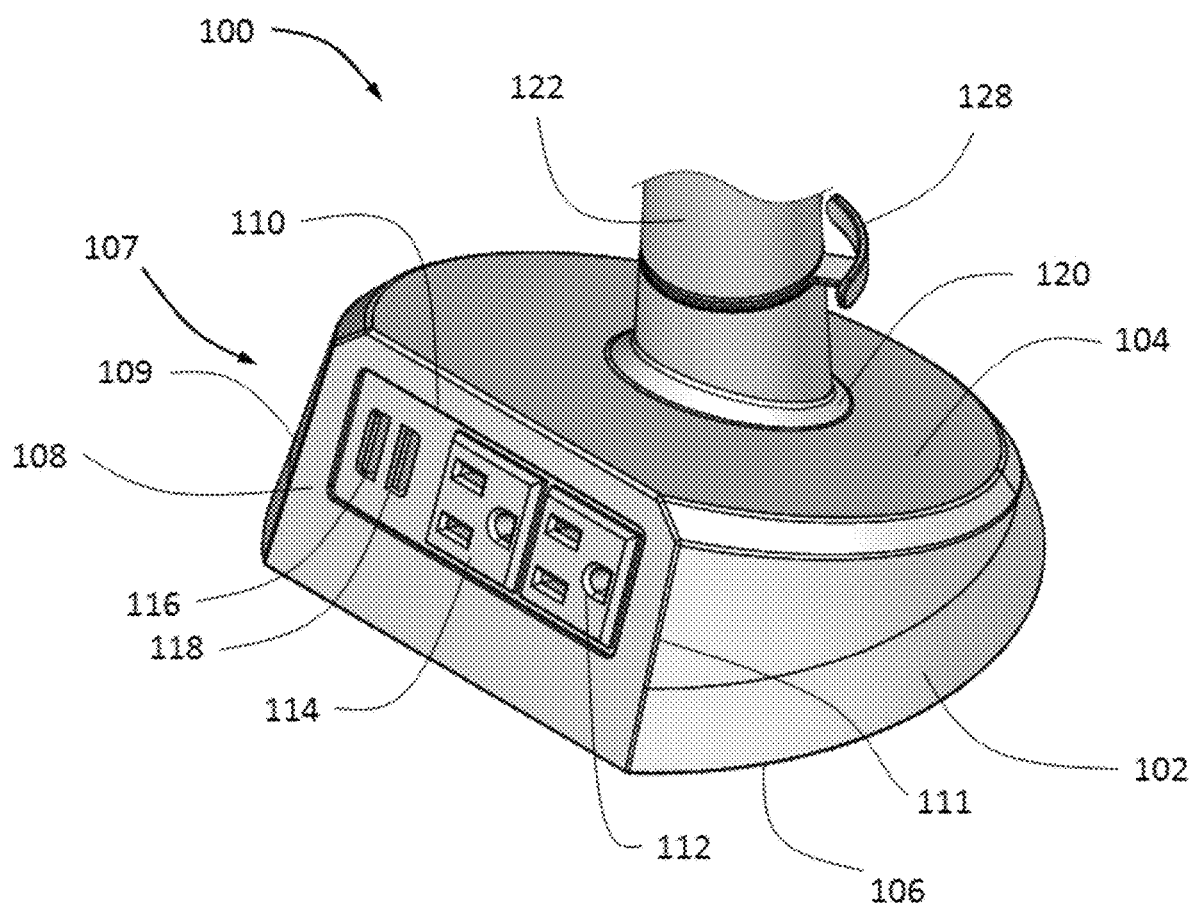
FIG. 1 is a perspective view of a base in accordance with an embodiment of the present invention.

An embodiment of a monitor stand base with integral power outlets and port connectors is shown in FIG. 1. In this regard, FIG. 1 shows a base 100 according to an embodiment of the present invention. Base 100 includes a housing comprising 107 a top surface 104, a bottom surface 106, a sidewall 102, and front wall 108. The side wall 102 and the front wall 108 extend between top surface 104 and bottom surface 106. Top surface 104 includes a mounting arm connector 122 secured by a connection element 120. Connection element 120 allows for rotation of mounting arm connector 122 about base 100. Side wall 102 is generally semi-circular in shape and extends along the entire periphery of top and bottom surfaces 104, 106 and connects to a first side 109 and a second side 111 of front wall 108.

The base may be mounted, or otherwise attached to an object. For instance, as further shown in FIG. 1, base 100 has a generally flat bottom and can be placed on a user's desk. Rearranging and relocating workstation space may be readily carried out by simply relocating base 100 to a desired location.

The base may include an outlet array. For instance, front wall 108 of base 100 includes an outlet array 110 with multiple power outlets and ports, as shown in FIG. 1. The outlet array 110 includes a first power outlet 112, a second power outlet 114, a first Universal Serial Bus ("USB") port 116 and a second USB port 118. USB ports 116 and 118 can include charging and data transfer features. The outlet array is conveniently located to allow the user to readily connect and detach any equipment such as a desktop accessory. A plug (not shown) from base 100 may be connected to a power outlet, such as a conventional wall outlet or desk outlet, to provide power for multiple equipment connected to base 100.

While a total of two power outlets and two USB port are shown in FIG. 1, any number, type, and arrangement of power outlets and ports may be provided along the base. For instance, the power outlets may include electrical outlets capable of handling a variety of voltage and current such as 120V, 220-240V, 15 A, 20 A, etc. Similarly, the ports may include different USB versions (e.g., USB type A, USB type B, USB version 2 and 3, USB micro, USB mini, etc.,) as well as other types of ports such as firewire, thunderbolt, etc. The USB ports can allow master or slave connections. The USB sockets can be a Micro USB socket. Additional non-limiting examples of power outlets and ports that may be used in conjunction with the base of the present invention are described further below.

Figure 2A:
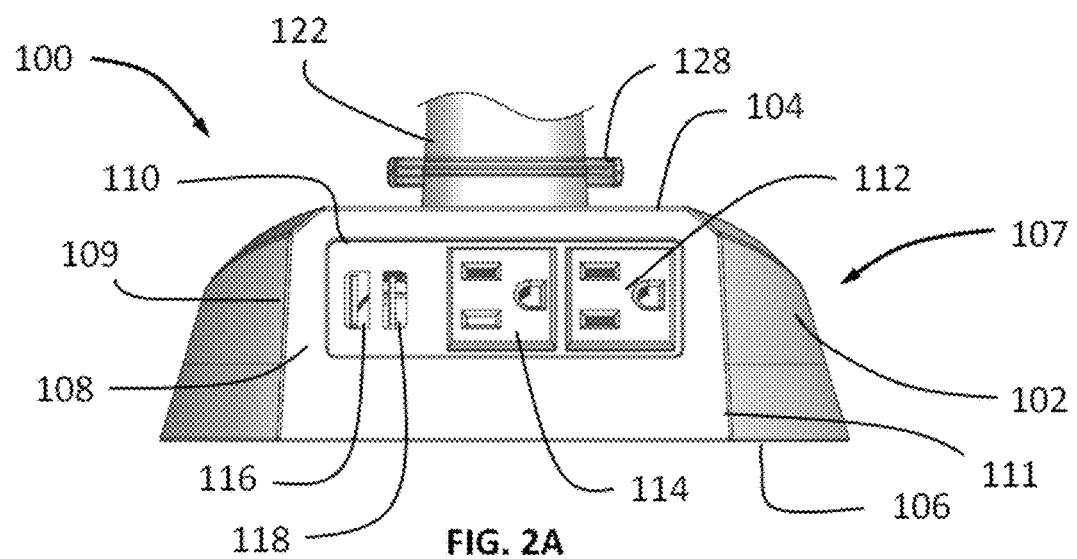
FIG. 2A is a front view of the base of FIG. 1.
Figure 2B:
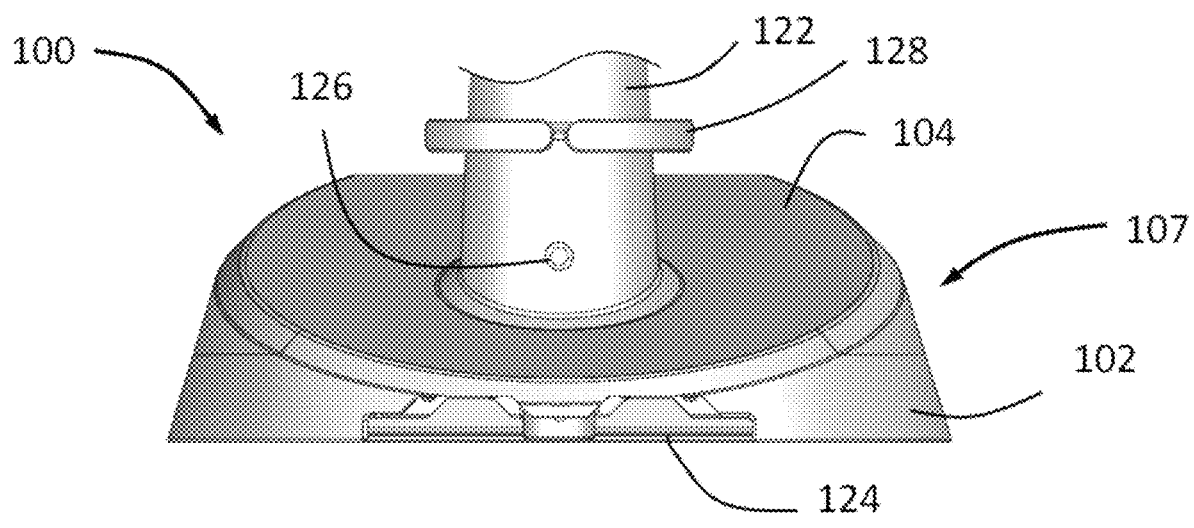
FIG. 2B is a back view of the base of FIG. 1.

FIGS. 2A and 2B show front and back views of base 100 respectively. Top surface 104 tapers from a front wall to an opposite side of side wall 102 such that the thickness of base 100 is greatest at front wall 108. This provides sufficient room within the base 100 to accommodate, and in some instances, fully integrate the power outlets 112 and 114 and ports 116 and 118 with base 100. Mounting arm connector 122 includes a cable clip 128 to allow a user to secure and manage one or more wires or cables connected to base 100. A screw 126 located at the back of mounting arm connector 122 is used to secure the mounting arm to base 100 as shown in FIG. 2B.

Figure 3A:
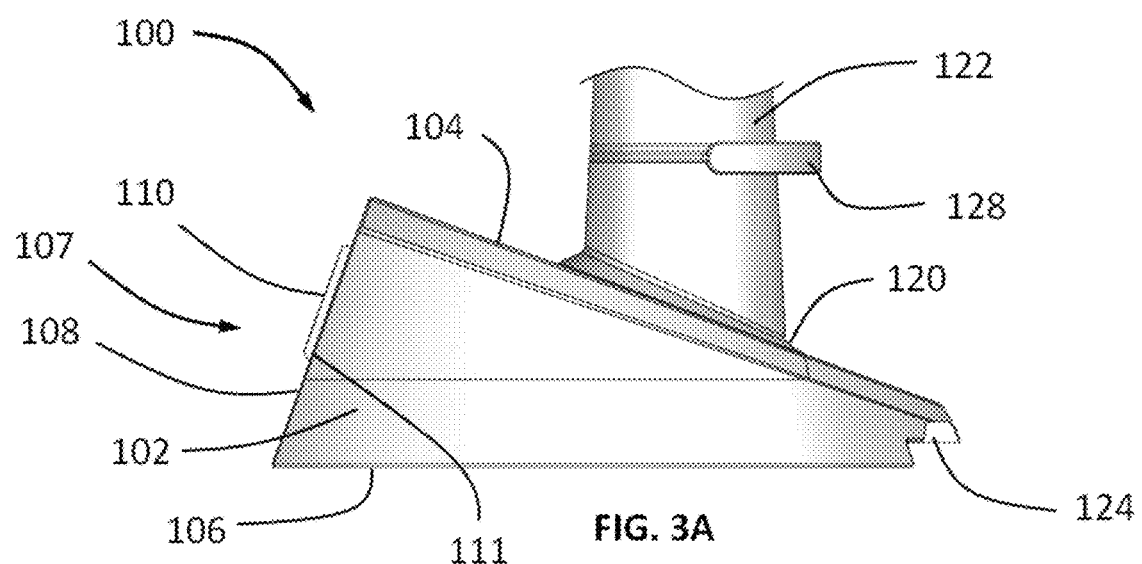
FIG. 3A is a first side view of the base of FIG. 1.
Figure 3B:
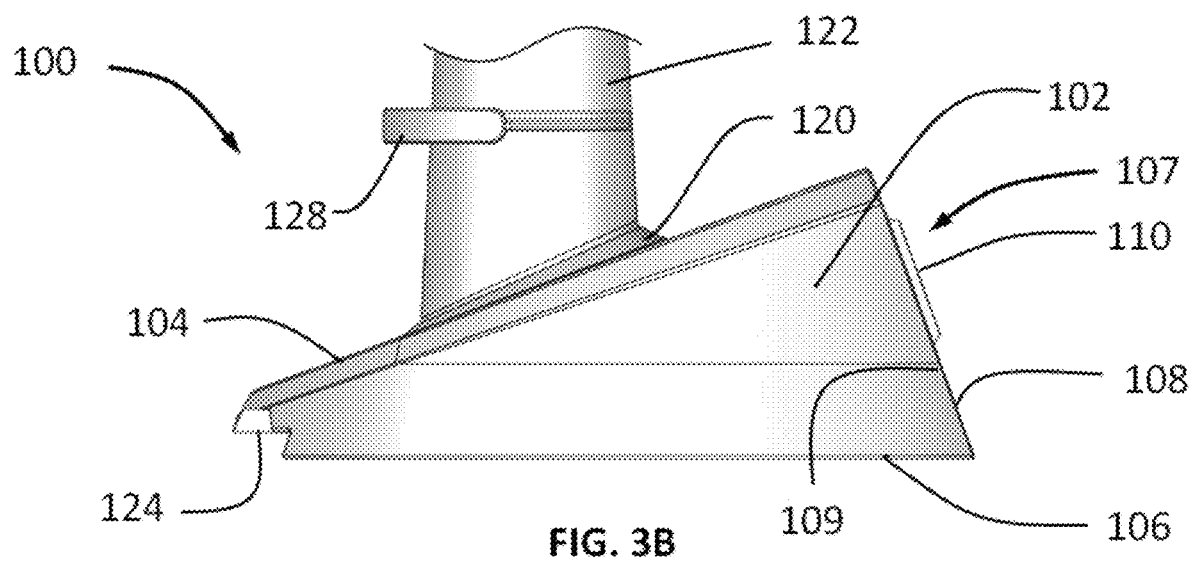
FIG. 3B is a second side view of the base of FIG. 1.

Referring now to FIGS. 3A and 3B, there is shown side elevation views of base 100. The tapered shape of base 100 is further illustrated in these figures. Bottom surface 106 is completely flat and allows for base 100 to be placed on a user's desk. Alternatively, a connecting plate assembly 124 can be provided on one end of the bottom surface 106 as shown in FIG. 3B. Connecting plate assembly 124 allows for connecting base 100 to mounting assemblies in conjunction with other desktop equipment as more fully explained below.

Figure 4A:
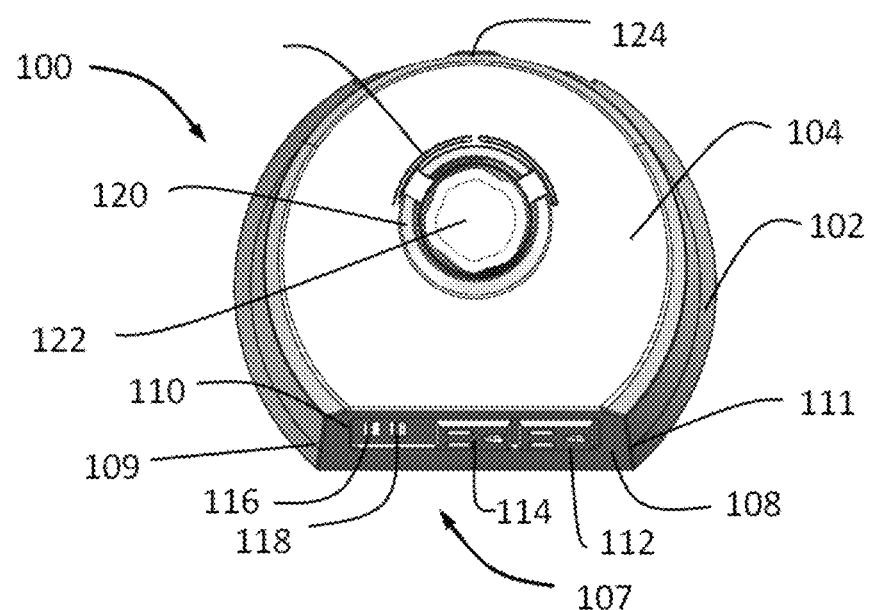
FIG. 4A is a top view of the base of FIG. 1.
Figure 4B:
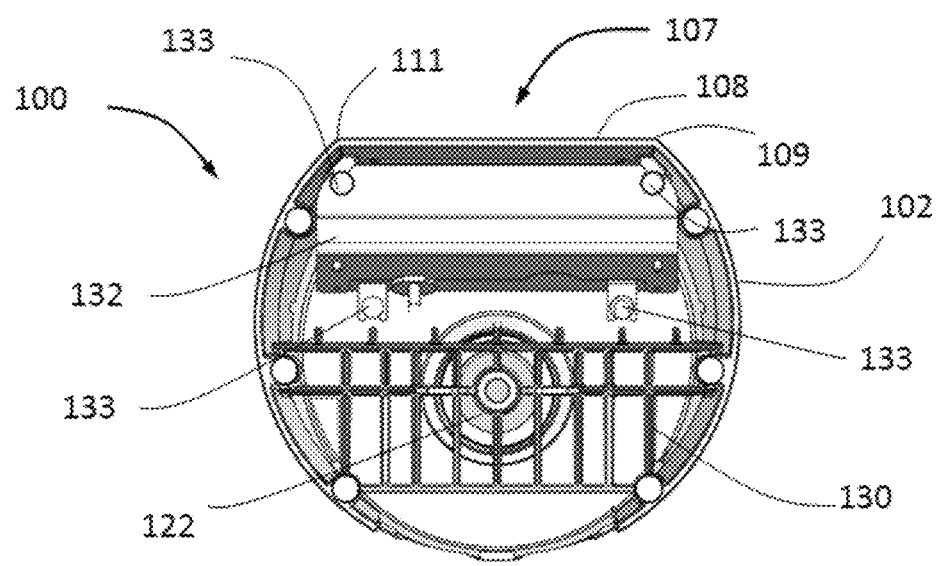
FIG. 4B is a bottom view of the base of FIG. 1.
Figure 5:
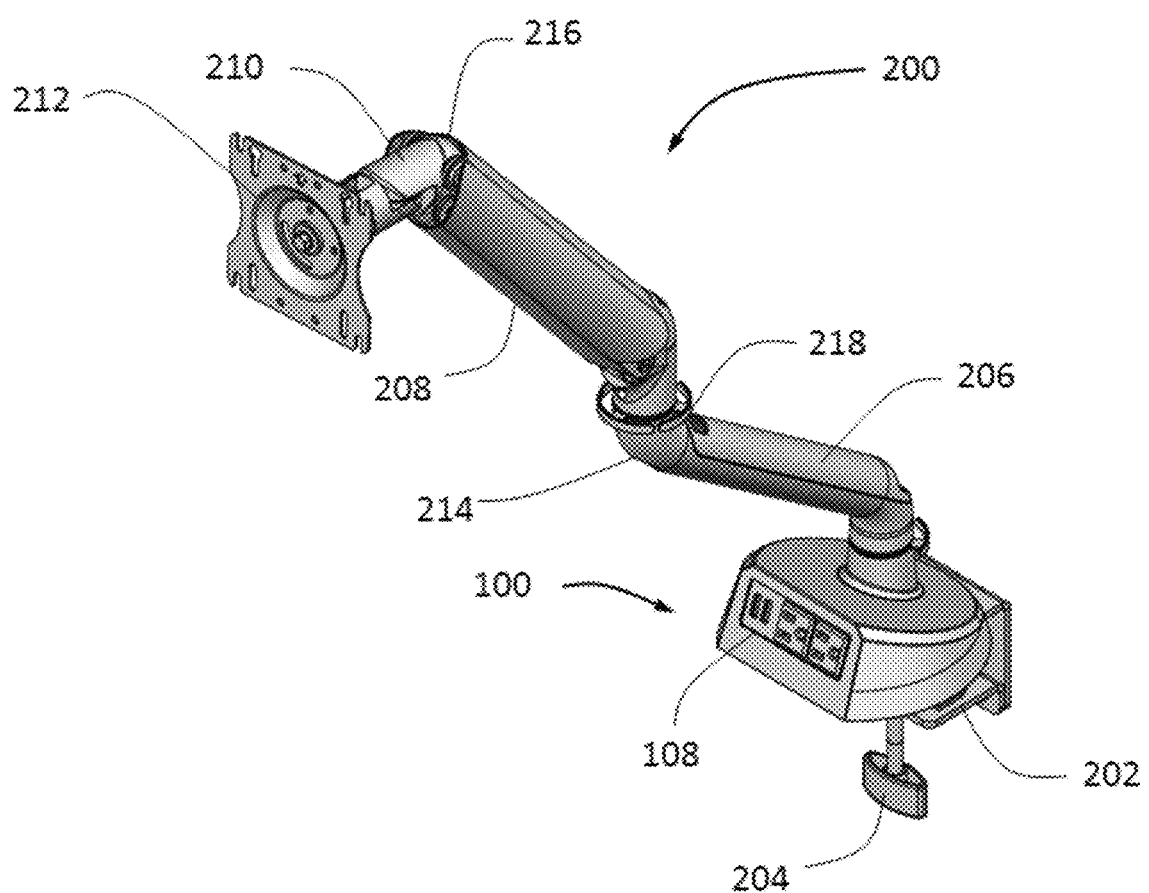
FIG. 5 is a perspective view of a mounting arm in conjunction with the base of FIG. 1.

FIGS. 4A and 4B show top and bottom views of base 100 respectively. As shown in FIG. 4A, mounting arm connector 122 is centrally located on base 100 such that the base can provide adequate stability for a monitor attached to mounting arm connector 122. A support structure 130 reinforces base 100 and also provides connection points for mounting base 100 to other support structures as shown in FIG. 4B. An outlet array cover 132 is used to secure outlet array 110 to completely cover and insulate power outlets as shown in FIG. 4B. Screws 133 are used to secure outlet array cover 132 to base 100 and provide ready access to power outlets if necessary Referring now to FIG. 5, there is shown a perspective view of a mounting arm 200 connected to base 100 according to an embodiment of the present invention. Mounting arm 200 includes a lower bracket 202 to connect to connecting plate 124 of base 100. An adjustable knob 204 is used to secure lower bracket 202 to connecting plate 124. For example, a user may rotate adjustable knob 204 in a first direction to allow for detachment of lower bracket 202 from base 100, and rotate in an opposite direction to securely attach lower bracket 202 and base 100. Thus, base 100 can be directly connected to lower bracket 202 without being placed directly on a desk. Mounting arm 200 has a first arm 206, a second arm 208 and a third arm 210, which are connected by joints to allow for positional adjustments. A first joint 208 allows for rotational and vertical height adjustment between first arm 206 and second arm 208. Similarly, a second joint 216 allows for rotational and vertical height adjustment between second arm 208 and third arm 210. A mounting bracket 212 to support a monitor (not shown) is provided at one end of third arm 210.

Figure 6A:
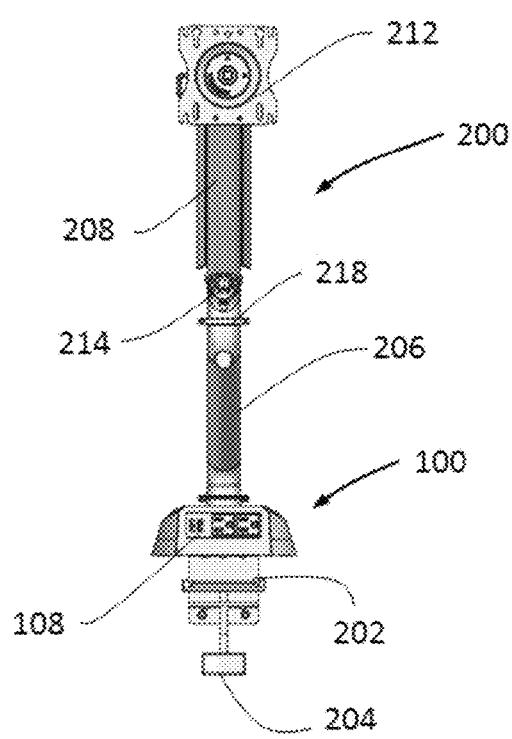
FIG. 6A is front view of the mounting arm and the base of FIG. 5.
Figure 6B:
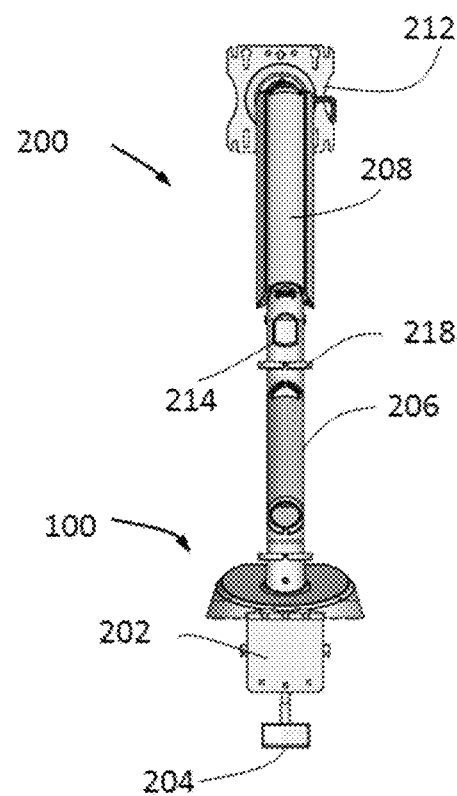
FIG. 6B is a back view of the mounting arm and the base of FIG. 5.

FIGS. 6A and 6B show front and back views respectively of mounting arm 200 connected to base 100. First, second, and third arms, 206, 208 and 210, define hollow interior channels (not shown) that allow one or more cables to be run through the arms. The arms further direct the cables through mounting arm connector 122 and base 100. Thus establishing cable channels through the base 100 and mounting arm 200 for a monitor secured to mounting bracket 212. Arm cable clips 218 are provided for additional cable management as seen in FIG. 6A.

Figure 7:
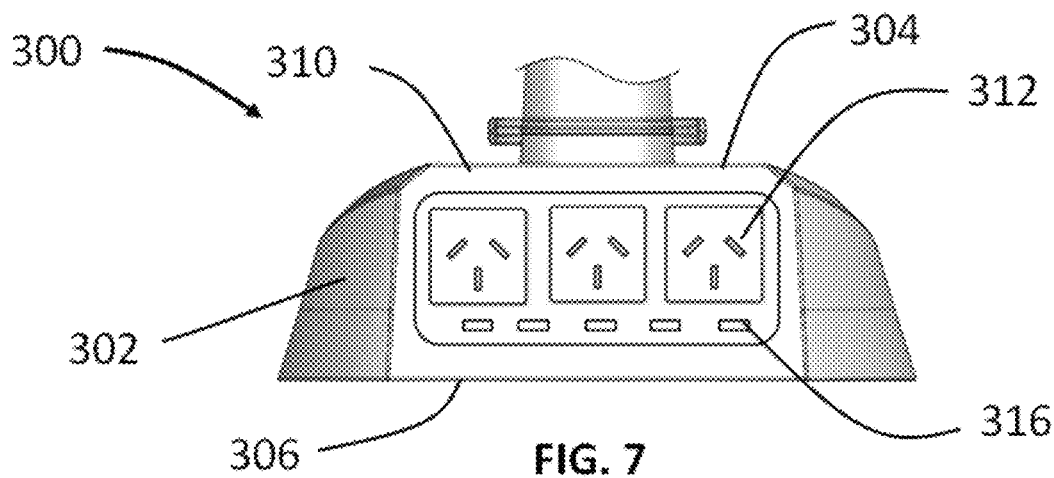
FIG. 7 is a front view of a base according to another embodiment of the present invention.
Figure 8:
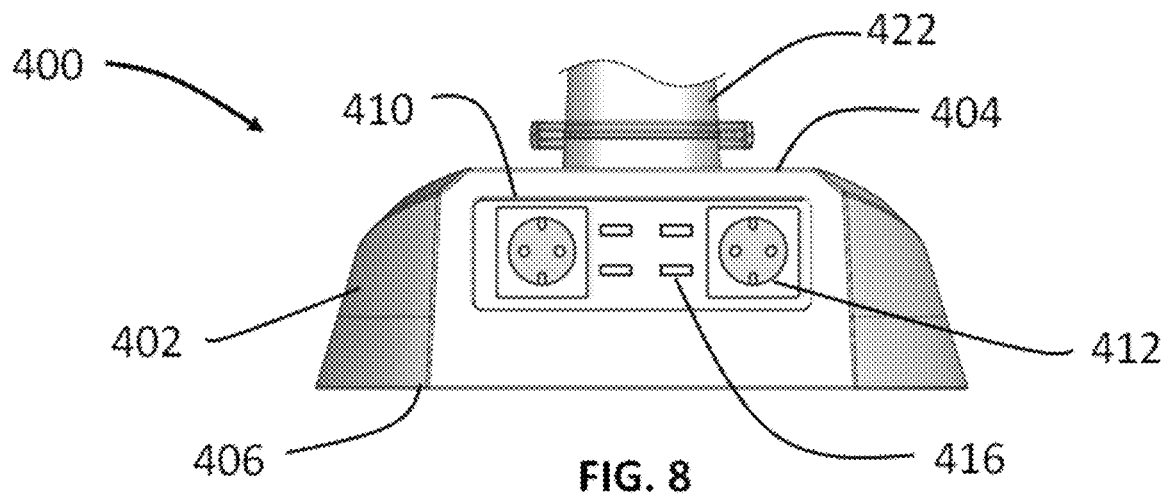
FIG. 8 is a front view of a base according to another embodiment of the present invention.
Figure 9:
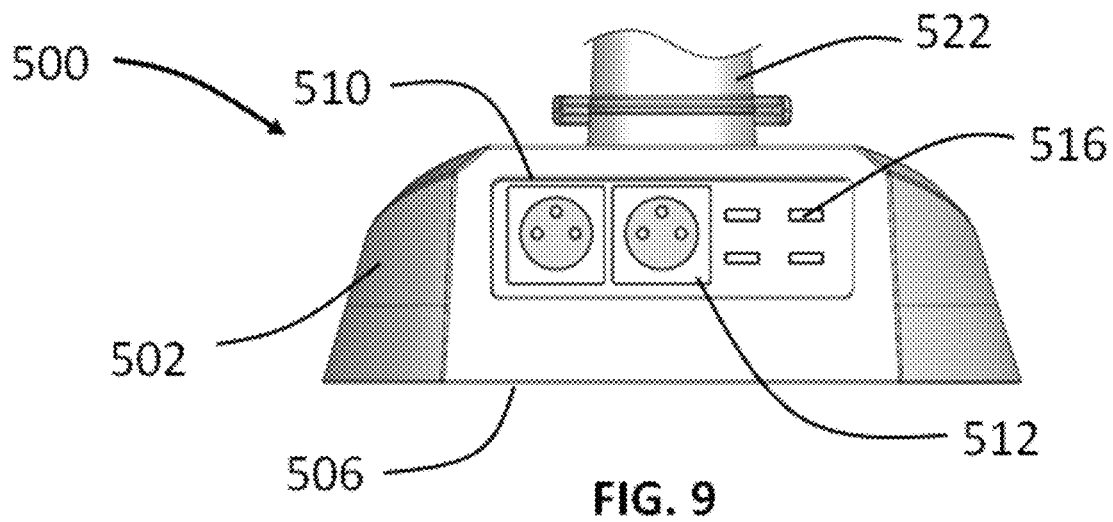
FIG. 9 is a front view of a base according to another embodiment of the present invention.

Referring now to FIGS. 7, 8 and 9 there are shown front views of base 300, base 400 and base 500, respectively, according to embodiments of the present invention. Base 300, base 400 and base 500 are similar to base 100, and therefore like elements are referred to with similar numerals within the 300-series, 400-series and 500-series of numbers respectively. For instance, base 300 includes top surface 304, a bottom surface 306 and side wall 302 extending therebetween. However, outlet array 310, in FIG. 7, includes Type-I power outlets 312, which are typically used in Australia, Argentina and China. USB outlets 316, as further shown in FIG. 7, are provided below the Type-I power outlets 312.

FIG. 8 shows a base 400 with an outlet array 410 with Type-F power outlets 412, which are typically used in Europe and Russia. USB outlets 416 are positioned between to the Type-F power outlets 412, as further shown in FIG. 8.

FIG. 9 shows a base 500 with an outlet array 510 with Type-E power outlets 512, which are commonly used in France, Belgium and Poland. USB outlets 516 are positioned adjacent to the Type-E power outlets 512, as further shown in FIG. 9. Other embodiments may have various other power outlets in different layouts. Although power outlets and USB ports are generally shown here, other embodiments of the present invention may include other output and input ports such as Ethernet, audio and video ports. While the shape of base shown here is generally cylindrical in shape, any other shape may be used to integrate power outlets to a monitor base in accordance with the present invention.

Furthermore, although the invention disclosed herein has been described with reference to particular features, it is to be understood that these features are merely illustrative of the principles and applications of the present invention. It is therefore to be understood that numerous modifications, including changes in the sizes of the various features described herein, may be made to the illustrative embodiments and that other arrangements may be devised, including combining illustrative embodiments, without departing from the spirit and scope of the present invention. In this regard, the present invention encompasses numerous additional features in addition to those specific features set forth in the paragraphs below. Moreover, the foregoing disclosure should be taken by way of illustration rather than by way of limitation as the present invention is defined in the examples of the numbered paragraphs, which describe features in accordance with various embodiments of the invention, set forth in the claims below.

The invention claimed is:

1. A monitor stand base comprising:
a housing including a flat bottom surface configured to position the monitor stand base on a surface;
an arm attached to the housing;
a cutout of the housing configured to receive and secure a bracket, the bracket including a first adjustable element to couple the bracket to the housing,
a support structure disposed within the housing, the support structure having a plurality of first and second ribs, the first ribs extending transverse to the second ribs, the support structure including a plurality of connection points to connect the monitor stand base to other supporting structures, and
an outlet array arranged within the housing, wherein the outlet array includes at least one power outlet, the outlet array including an outlet array cover attached to the housing to secure and insulate the at least one power outlet,
wherein the support structure and the outlet array cover are disposed entirely within the housing, and the outlet array is partially disposed within the housing.

2. The monitor stand base of claim 1, wherein the arm includes a second adjustable element to detachably attach the arm to the housing.

3. The monitor stand base of claim 2, wherein the second adjustable element is a rotatable knob.

4. The monitor stand base of claim 1, further including one or more cable clips for cable management.

5. The monitor stand base of claim 4, wherein the arm includes two or more links.

6. The monitor stand base of claim 5, wherein at least one of the one or more links include telescopic elements to increase the length of the link.

7. The monitor stand base of claim 5, wherein the one or more links are rotatable with respect to each other.

8. The monitor stand base of claim 1, wherein the outlet array further includes one or more ports.

9. The monitor stand base of claim 8, wherein the one or more ports include a Universal Serial Bus (USB) socket.

10. The monitor stand base of claim 8, wherein the one or more ports include a firewire socket.

11. The monitor stand base of claim 10, wherein the one or more ports include a thunderbolt socket.

12. The monitor stand base of claim 8, wherein the USB socket is a USB slave device.

13. The monitor stand base of claim 8, wherein the USB socket is a Micro USB socket.

* * * * *